(12) United States Patent
Jones et al.

(10) Patent No.: US 11,168,242 B2
(45) Date of Patent: Nov. 9, 2021

(54) COMPATIBLE LOW CRYSTALLINE SILICA SPACERS

(71) Applicant: Halliburton Energy Services, Inc., Houston, TX (US)

(72) Inventors: Paul Joseph Jones, Houston, TX (US); Ryan Keeran, Thronton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 16 days.

(21) Appl. No.: 16/620,420

(22) PCT Filed: Feb. 1, 2019

(86) PCT No.: PCT/US2019/016402
§ 371 (c)(1),
(2) Date: Dec. 6, 2019

(87) PCT Pub. No.: WO2020/159549
PCT Pub. Date: Aug. 6, 2020

(65) Prior Publication Data
US 2021/0047555 A1    Feb. 18, 2021

(51) Int. Cl.
*E21B 33/14*    (2006.01)
*C09K 8/40*    (2006.01)
(Continued)

(52) U.S. Cl.
CPC .................. *C09K 8/40* (2013.01); *C09K 8/34* (2013.01); *C09K 8/424* (2013.01); *C09K 8/46* (2013.01); *E21B 33/14* (2013.01)

(58) Field of Classification Search
None
See application file for complete search history.

(56) References Cited

U.S. PATENT DOCUMENTS

| 7,143,827 B2 | 12/2006 | Chatterji et al. |
| 7,883,740 B2 | 2/2011 | Nguyen et al. |

(Continued)

FOREIGN PATENT DOCUMENTS

| CN | 103740341 | 4/2014 |
| WO | 97-44405 | 11/1997 |
| WO | 2017074301 | 5/2017 |

OTHER PUBLICATIONS

ISRWO International Search Report and Written Opinion for PCT/US2019/016402 dated Oct. 21, 2019.

*Primary Examiner* — Andrew Sue-Ako
(74) *Attorney, Agent, or Firm* — Thomas Rooney; C. Tumey Law Group PLLC

(57) ABSTRACT

The present disclosure relates to spacer fluids for use in subterranean operations and, more particularly, in certain embodiments, to spacer fluids that include a spacer additive comprising a solid scouring material and a biopolymer gum while being essential free of clay. An example method may comprise spacer fluid comprise water and a spacer additive. The spacer additive may comprise a solid scouring material and a biopolymer gum, wherein the solid scouring material comprises crystalline silica in an amount of about 5 wt. % or less, and wherein the spacer fluid is essentially free of clay. The example method may further comprise and introducing the spacer fluid into a wellbore to displace at least a portion of a first fluid in the wellbore.

17 Claims, 2 Drawing Sheets

(51) Int. Cl.
    *C09K 8/34*         (2006.01)
    *C09K 8/42*         (2006.01)
    *C09K 8/46*         (2006.01)

(56) References Cited

U.S. PATENT DOCUMENTS

| | | |
|---|---|---|
| 8,691,737 B2 | 4/2014 | Chatterji et al. |
| 8,921,284 B2 | 12/2014 | Benkley et al. |
| 9,133,386 B2 | 9/2015 | Kumar et al. |
| 9,903,177 B2 | 2/2018 | Agapiou et al. |
| 10,011,755 B2 | 7/2018 | Kumar et al. |
| 10,047,270 B2 | 8/2018 | Pisklak et al. |
| 10,160,900 B2 | 12/2018 | Morgan et al. |
| 2006/0166836 A1 | 7/2006 | Pena et al. |
| 2011/0118155 A1* | 5/2011 | Pisklak ............... C04B 20/1074 507/274 |
| 2013/0210685 A1 | 8/2013 | Chatterji et al. |
| 2014/0158354 A1* | 6/2014 | Kumar ..................... C09K 8/08 166/293 |
| 2015/0129217 A1* | 5/2015 | Vorderbruggen ....... C04B 28/02 166/294 |
| 2018/0265763 A1 | 9/2018 | Leotaud et al. |
| 2019/0048247 A1* | 2/2019 | Pernites ................. E21B 33/14 |

\* cited by examiner

COMPATIBLE LOW CRYSTALLINE SILICA SPACERS

BACKGROUND

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change-outs or between a drilling fluid and completion brine. Spacer fluids typically do not consolidate in that the spacer fluids typically do not develop significant gel or compressive strength.

The spacer fluid can have certain characteristics to improve its effectiveness. For example, the spacer fluid may be compatible with the displaced fluid and the cement composition. This compatibility may also be present at downhole temperatures and pressures. In some instances, spacer fluids may be used to displace oil-based drilling fluids, often referred to as "oil-based muds," from a wellbore. Oil-based drilling fluids are typically an invert emulsion that includes an aqueous internal phase and an oil external phase. However, certain spacer fluids may exhibit negative interactions when contact and mixing occurs in the wellbore with the oil-based drilling fluids. This negative interaction may be referred to as "incompatibility" and may be observed as a significant increase in viscosity greater than either the viscosity of the spacer fluid or the oil-based drilling fluid.

BRIEF DESCRIPTION OF THE DRAWINGS

These drawings illustrate certain aspects of some of the embodiments of the present disclosure and should not be used to limit or define the present disclosure.

DETAILED DESCRIPTION

Figure 1:
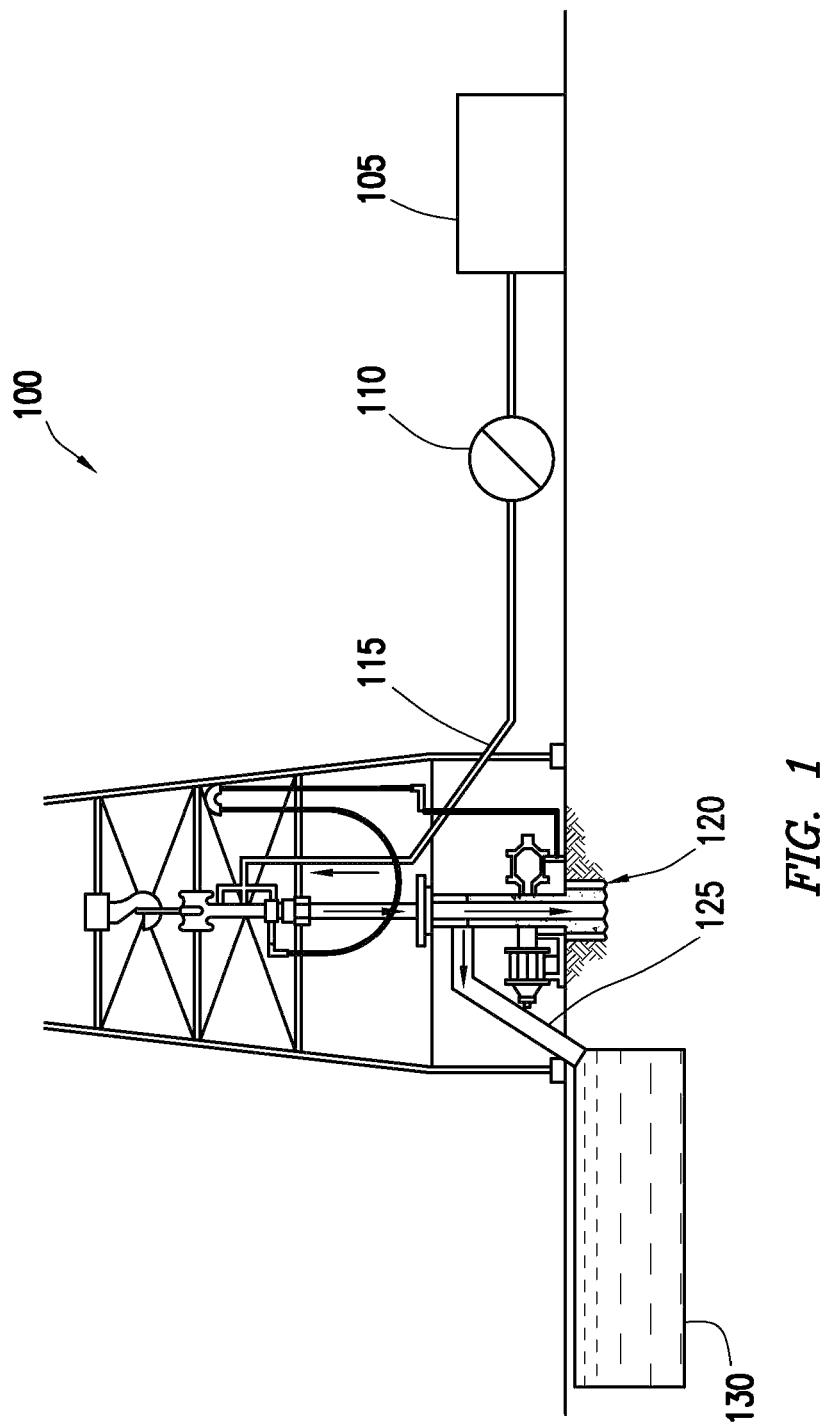
FIG. 1 is a schematic illustration of an example system for the preparation and delivery of a spacer fluid to a wellbore.

The present disclosure relates to spacer fluids for use in subterranean operations and, more particularly, in certain embodiments, to spacer fluids that include a spacer additive comprising a solid scouring material and a biopolymer gum while being essential free of clay. By using the biopolymer gum instead of clay for viscosity, the spacer fluids may have improved compatibility with displaced fluids, such as oil-based drilling fluids. In addition, the spacer fluids may exhibit improved resistance to gelation upon contact with oil-based drilling fluids in the well bore, resulting in improved recovery of the oil-based drilling fluids and reduced equivalent circulating density. The spacer fluids may also include a solid surfactant composite, for example, that should also improve compatibility of the spacer fluid. The solid scouring material used in the spacer fluids may also be considered low crystalline silica (i.e., about 5 wt. % or less). By using solids scouring materials that are low crystalline silica, exposure of personal crystalline silica may be reduced, thus reducing or potentially limiting health hazards from inhalation of silica particles. In addition to the solid scouring material, biopolymer gum, and solid surfactant, the spacer fluids may further include defoaming agents and weighting agents as desired for a particular application.

Embodiments may include preparing a spacer dry blend that includes a spacer additive and a solid surfactant composite, wherein the spacer additive comprises a solid scouring material and a biopolymer gum. The spacer dry blend may further include optional additives, including, defoaming agents and weighting agents. The spacer dry blend may be prepared at any suitable location. By way of example, the spacer dry blend may be prepared at the well site or at a remote location from the well site, such as a cement bulk plant. At the well site, the spacer dry blend may be combined with water, and the resulting spacer fluid may then be pumped into the wellbore. In other embodiments, one or more of spacer fluid components may be individually combined with the water at the well site to form the spacer fluid.

Embodiments of the spacer fluids may include spacer additive that includes a solid scouring material, for example, to scrub and facilitate removal of solid filter cake on wellbore surfaces. In some embodiments, suitable solid scouring materials may have a Mohs hardness of about 6 of greater. In some embodiments, suitable solid scouring materials may have a high angularity such that the solid scouring material has sharp and/or jagged corners. By having sharp and/or jagged corners, the solid scouring material may have improved scouring with higher impact pressures. Angularity and roundness are both terms that can be used to describe the shape of the corners on a particle. The higher the angularity of a particle (e.g., angular particle), the lower the roundness of that particle. Similarly, the higher the roundness of a particle, the lower the angularity of that particle. As will be appreciated by one of skill in the art, and with the help of this disclosure, examples of suitable solid scouring materials may have high angularity. In some embodiments, suitable solid scouring materials have roundness of less than about 0.6 and a sphericity less than about 0.6. Roundness generally refers to the sharpness of the corners and edges of a grain/particle and it may be defined as the ratio of the average radius of curvature of the corners to the radius of the largest inscribed circle. Since can be quite time consuming to measure roundness, the common method of estimating roundness is to visually compare grains of unknown roundness with standard images of grains of known roundness. Sphericity generally measures the degree to which a particle approaches a spherical shape, and it may be defined as the ratio between the diameter of a sphere with the same volume as the particle and the diameter of the circumscribed sphere. The sphericity of a particle is usually determined by measuring the three linear dimensions of the particle: longest diameter, intermediate diameter and shortest diameter.

In addition, the solid scouring material may be considered low crystalline silica, in that the solid scouring material may contain reduced amounts of crystalline silica (i.e., about 5 wt. % or less). For example, the solid scouring material may contain crystalline silica in an amount of about 5 wt. % or less, about 3 wt. % or less, or about 1 wt. % or less. In some embodiments, the solid scouring material may be free and/or essentially free of crystalline silica.

Examples of suitable solid scouring materials may include, but are not limited to, pumice, perlite, other volcanic glasses, fumed silica, and fly ash, among others. In embodiments, the solid scouring material may have a specific gravity of about 2.5 or less. In some embodiments, the solid scouring material may include pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size of about 1 micron to about 200 microns as defined by ASTM methods. The mean particle size corresponds to d50 values as measured by particle size analyzers such as those manufactured by Malvern Instruments, Worcestershire, United Kingdom. In specific embodiments, the pumice may have a mean particle size of from about 1 micron to about 200 microns, from about 5 microns to about 100 microns, or from about 10 microns to about 25 microns. The solid scouring material may be present in the spacer additive in any suitable amount, including, but not limited to, an amount of about 50 wt. % to about 99.9 wt. % based on a total weight of the spacer additive. In specific embodiments, the solid scouring material may be present in an amount of about 90 wt. % to about 99 wt. % or from about 95 wt. % to about 98 wt. % based on a total weight of the spacer additive. In a specific example, the solid scouring material may be present in the spacer additive in an amount of about 97.6 wt. % based on a total weight of the spacer additive. One of ordinary skill in the art, with the benefit of this disclosure, should be able to select an appropriate particle size and concentration for the solid scouring material.

Embodiments of the spacer fluids may include a spacer additive that includes a biopolymer gum. Examples of suitable biopolymer gums may include, but are not limited to, xanthan gum, diutan gum, welan gum, scleroglucan gum, and combinations thereof. The biopolymer gum may be present in the spacer additive in any suitable amount, including, but not limited to, an amount of about 0.1 wt. % to about 10 wt. % based on a total weight of the spacer additive. In specific embodiments, the solid scouring material may be present in an amount of about 1 wt. % to about 5 wt. % or from about 2 wt. % to about 3 wt. % based on a total weight of the spacer additive. In a specific example, the biopolymer gum may be present in the spacer additive in an amount of about 97.6 wt. % based on a total weight of the spacer additive. One of ordinary skill in the art, with the benefit of this disclosure, should be able to select an appropriate concentration for the biopolymer.

The rheology and amount of solid scouring material and biopolymer gum in the spacer dry blend containing scouring agent, biopolymer gum, solid surfactant composite, defoaming agent, and/or weighting agent may be modified as desired to obtain a spacer fluid with desired properties. For example, reducing the weight percent of the biopolymer gum in the spacer dry blend should reduce the shear stress produced by the spacer fluid at a given shear rate per unit mass of spacer additive in the spacer dry blend. At low amounts such as 0.1 wt. % biopolymer gum in the spacer additive achieving needed rheology in higher density spacer fluids may be hindered. If weight percent of the biopolymer gum in the spacer additive is increased to an elevated amount such as 10 wt. % or higher, the amount of solid scouring material may be reduced to such an extent that it becomes ineffective at scrubbing mud filter cake from the wellbore. In some embodiments, the spacer additive may have a biopolymer gum to solid scouring material weight ratio of about 0.5:99.5 to about 10:90 or about 1:99 to about 5:95 or from about 2:98 to about 3:97. In some embodiments, the biopolymer to solid scouring material weight ratio may be about 2.4 biopolymer gum to about 97.6 solid scouring material.

The spacer additive may be included in the spacer dry blend in any suitable amount. In some embodiments, the spacer additive including the solid scouring material and the biopolymer gum may be included in the spacer dry blend in an amount of about 20 wt. % to about 100 wt. % based on a total weight of the spacer dry blend. In specific embodiments, the spacer dry blend may be present in an amount of about 20 wt. % to about 50 wt. %, about 60 wt. % to about 99 wt. %, about 80 wt. % to about 99 wt. %, or about 90 wt. % to about 100 wt. % based on a total weight of the spacer dry blend.

Embodiments of the spacer fluids may include a solid surfactant composite, which may include a surfactant and a solid carrier. Optionally, the solid surfactant composite may include a dispersant, a defoaming agent, or a combination thereof. The solid surfactant composite may have a wide variety of shapes and sizes of individual particles suitable for use in well applications. By way of example, individual particles of the solid surfactant composite may have well-defined physical as well as irregular geometries, including the physical shape of platelets, shavings, fibers, flakes, ribbons, rods, strips, spheroids, hollow beads, toroids, pellets, tablets, or any other physical shape. Without limitation, the solid surfactant composite may have a mean particle size in the range of about 5 microns to about 1,500 microns and, alternatively, a mean particle size in the range of about 20 microns to about 500 microns. However, particle sizes outside these defined ranges also may be suitable for particular applications.

The solid surfactant composite may be included in the spacer dry blend in any suitable amount. In some embodiments, the solid surfactant composite may be included in the spacer dry blend in an amount of about 0.1 wt. % to about 10 wt. % based on a total weight of the spacer dry blend. In specific embodiments, the spacer dry blend may be present in an amount of about 1 wt. % to about 10 wt. %, about 1 wt. % to about 5 wt. %, or about 2 wt. % to about 5 wt. % based on a total weight of the spacer dry blend.

Any of a variety of surfactants may be included in the solid surfactant composite that may be capable of wetting well surfaces (e.g., water- or oil-wetting), such as the wellbore wall and casing surface. The function that a particular surfactant may perform depends on a variety of factors. These factors may include, but are not limited to, the choice of the hydrophobic and hydrophilic portions and the relative amounts thereof and the presence of any cationic, ionic, non-ionic, amphoteric, or Zwitterionic groups. In some embodiments, both a water-wetting surfactant and an oil-wetting surfactant may be included in the solid surfactant composite. The wetting surfactant may be included in the solid surfactant composite in an amount, without limitation, of from about 5 wt. % to about 99.9 wt. % based on a total weight of the solid surfactant composite. By way of example, the wetting surfactant may be included in an amount of from about 5 wt. %, about 10 wt. %, about 20 wt. %, about 30 wt. %, about 40 wt. %, about 50 wt. %, about 60 wt. %, about 70 wt. %, about 80 wt. %, about 90 wt. %, or about 99.9 wt. % based on a total weight of the solid surfactant composite. Examples of suitable wetting surfactants may include alcohol ethoxylates, alcohol ethoxysulfates, alkyl phenol ethoxylates (e.g., nonyl phenol ethoxylates), glycol ethers, and combinations thereof. Certain of the wetting surfactants may be used as water-soluble salts. For example, the wetting surfactants may be selected from alkali metal, alkaline earth metal, ammonium, and alkanolammonium salts of alcohol ethoxylates, alcohol ethoxysulfates, and alkyl phenol ethoxylates. One of ordinary skill in the art, with the benefit of this disclosure, should be able to select an appropriate wetting surfactant and concentration thereof for a particular application.

As previously described, the wetting surfactant may be disposed on a solid carrier. Without limitation, the solid carrier may include any of a variety of solid materials, such as diatomaceous earth, amorphous silica, starch, calcium silicate, and combinations thereof. The solid carrier may be included in the solid surfactant composite in an amount, without limitation, of from about 0.1 wt. % to about 95 wt. % based on a total weight of the solid surfactant composite. By way of example, the solid carrier may be included in an amount of from about 0.1 wt. %, about 10 wt. %, about 20 wt. %, about 30 wt. %, about 40 wt. %, about 50 wt. %, about 60 wt. %, about 70 wt. %, about 80 wt. %, about 90 wt. %, or about 95 wt. % based on a total weight of the solid surfactant composite. One of ordinary skill in the art, with the benefit of this disclosure, should be able to select an appropriate solid carrier and concentration thereof for a particular application.

Optionally, the solid surfactant composite may include a dispersant. Without limitation, suitable dispersants may include any of a variety of commonly used cement dispersants, such as sulfonated dispersants; sulfonated polymer dispersants; naphthalene sulfonates; melamine sulfonates; sulfonated melamine formaldehyde condensate; sulfonated naphthalene formaldehyde condensate; sulfonate acetone formaldehyde condensate; ethoxylated polyacrylates; or combinations thereof. One example of a suitable dispersant may include a naphthalene sulfonate condensed with from about 4 moles to about 8 moles and, alternatively, about 6 moles of formaldehyde. The dispersant may be included in the solid surfactant composite in an amount, without limitation, of from about 10 wt. % to about 90 wt. % based on a total weight of the solid surfactant composite. By way of example, the dispersant may be included in an amount of from about 10 wt. %, about 20 wt. %, about 30 wt. %, about 40 wt. %, about 50 wt. %, about 60 wt. %, about 70 wt. %, about 80 wt. %, or about 90 wt. % based on a total weight of the solid surfactant composite. One of ordinary skill in the art, with the benefit of this disclosure, should be able to select an appropriate dispersant and concentration thereof for a particular application.

Optionally, the solid surfactant composite may include a defoaming agent. The defoaming agent may be include in the solid surfactant composite in addition to, or separate from, the dispersant. Suitable defoaming agents may include compounds used in well operations to prevent a well treatment fluid from foaming during mixing and pumping. Without limitation, suitable defoaming agents may include polyol compositions, siloxanes such as polydimethyl siloxane, acetylenic diols, and combinations thereof. The defoaming agent may be included in the solid surfactant composite in addition to, or separate from, the dispersant. The defoaming agent may be included in the solid surfactant composite in an amount, without limitation, of from about 0.1 wt. % to about 20 wt. % based on a total weight of the solid surfactant composite. By way of example, the defoaming agent may be included in an amount of from about 0.1 wt. %, about 5 wt. %, about 10 wt. %, about 15 wt. %, or about 20 wt. % based on a total weight of the solid surfactant composite. One of ordinary skill in the art, with the benefit of this disclosure, should be able to select an appropriate defoaming agent and concentration thereof for a particular application.

Without limitation, a solid surfactant composite may include an alcohol ethoxylate, a solid carrier including amorphous silica, a dispersant, and a defoaming agent. By way of example, the solid surfactant composite may include a $C_8$ to $C_{12}$ alcohol substituted with about 4 moles to about 8 moles of ethylene oxide, amorphous silica, a sulfonated naphthalene formaldehyde condensate, and a siloxane. By way of further example, the solid surfactant composite may include isodecyl alcohol substituted with 6 moles of ethylene oxide, amorphous silica, naphthalene sulfonate condensed with 6 moles of formaldehyde, and a polydimethyl siloxane.

Without limitation, a solid surfactant composite may include an alcohol ethoxylate, a solid carrier, a dispersant, and a defoaming agent. By way of example, the solid surfactant composite may include a $C_{12}$ to $C_{14}$ alcohol substituted with about 10 moles to about 14 moles of ethylene oxide, amorphous silica, diatomaceous earth, a sulfonated naphthalene formaldehyde condensate, and a siloxane. By way of further example, the solid surfactant composite may include isotridecyl alcohol substituted with 12 moles ethylene oxide, amorphous silica, diatomaceous earth, naphthalene sulfonate condensed with 6 moles of formaldehyde, and a polydimethyl siloxane.

The solid surfactant composite may be prepared by any suitable technique. By way of example, the components (e.g., wetting surfactant, solid carrier, dispersant, and/or defoaming agent) may be combined to form a mixture. This mixture may then be dried, such as by spray drying, to form a substantially dry solid product. Other suitable techniques for preparation of the solid surfactant composite may also be used as should be apparent to one of ordinary skill in the art.

A wide variety of additional additives may be included in the spacer dry blend as deemed appropriate by one skilled in the art, with the benefit of this disclosure. Examples of such additives include but are not limited to: weighting agents (e.g., barite), defoaming agents. Weighting agents may be included in the spacer dry blend, for example, to provide the spacer fluid with a desired density. Examples of suitable weighting agents include, for example, materials having a specific gravity of 2.5 or greater, such as barite, manganese tetraoxide, iron oxide, calcium carbonate, or iron carbonate. Weighting agents may be included in any suitable amount, including, but not limited to, from about 1 wt. % to about 99 wt. %, about 50 wt. % to about 99 wt. %, or about 75 wt. % to about 99 wt. % based on a total weight of the spacer dry blend. Defoaming agents may be included in the spacer dry blend, for example, to reduce undesirable foaming in the spacer fluid upon mixing and instruction into the wellbore. Examples of suitable defoaming agents may include, but are not limited to, polyol compositions, siloxanes such as polydimethyl siloxane, acetylenic diols, ethoxylated alcohols, propoxylated alcohols, fatty alcohol ethoxylates, internal olefins and combinations thereof. Defoaming agents may be included in any suitable amount, including, but not limited to, from about 0.01 wt. % to about 10 wt. %, about 0.05 wt. % to about 5 wt. %, or about 0.05 wt. % to about 1 wt. % based on a total weight of the spacer dry blend. A person having ordinary skill in the art, with the benefit of this disclosure, should readily be able to determine the type and amount of additive useful for a particular application and desired result. While these additives are described as being included in the spacer dry blend, it is also contemplated that one or more of these additives may be added directly to the water, which may occur before, during, or after addition of the spacer dry blend to the water.

As previously described, the spacer dry blend may be combined with water to form a spacer fluid, which may then be introduced into the wellbore. The water used in an embodiment of the spacer fluids may include, for example, freshwater, saltwater (e.g., water containing one or more salts dissolved therein), brines, seawater, or any combination thereof. Generally, the water may be from any source, provided that the water does not contain an excess of compounds that may undesirably affect other components in the spacer fluid. The water is included in an amount sufficient to form a pumpable spacer fluid. In some embodiments, the water may be included in the spacer fluids in an amount in the range of from about 15 wt. % to about 95 wt. % based on a total weight of the spacer fluid. In other embodiments, the water may be included in the spacer fluids in an amount in the range of from about 25 wt. % to about 85 wt. % or about 50 wt. % to about 75 wt. % based on a total weight of the spacer fluid. The spacer dry blend may be included in the spacer fluid in any suitable amount, including about 5 wt. % to about 50 wt. %, about 10 wt. % to about 60 wt. %, or about 20 wt. % to about 50 wt. % based on a total weight of the spacer fluid. One of ordinary skill in the art, with the benefit of this disclosure, should recognize the appropriate amount of water and spacer dry blend to include for a chosen application.

In addition, the spacer fluids and/or spacer dry blends may be considered low crystalline silica, in that the spacer fluids and/or dry spacer fluids may contain reduced amounts of crystalline silica, not including any potential weighting agent (e.g., barite) that may be included. For example, the spacer fluids and/or spacer dry blends may contain crystalline silica in an amount of about 5% or less, about 3% or less, or about 1% or less by weight. In some embodiments, the spacer fluids and/or spacer dry blends may be free and/or essentially free of crystalline silica.

In addition, embodiments of the spacer fluids and/or spacer dry blends may be essentially free of clay in that they may contain no clay, or, to the extent that clay may be present, the clay is present in an amount of no more than 2 wt. %. In some embodiments, the spacer fluids may contain no clay, or, to the extent that clay may be present, the clay is present in an amount of no more than 1 wt. %, 0.5 wt. %, 0.1 wt. %, or less. A number of different clays are commonly included in spacer fluids and/or spacer dry blends, including, but not limited to, montmorillonite clays, attapulgite clays, and sepiolite clays. In contrast to conventional spacers fluids that utilize clay for viscosity, the spacer fluids comprising the spacer additive may use the biopolymer gum for viscosity. When clays are intercalated the platelets are stacked in layers with ions between the layers. As the clays exfoliate surfactants and ionic fluids with the mud often interact unpredictably with ionically charged platelets. This can result in gelation as well as lack of appropriate viscous properties. By reducing or potentially even eliminating clay from the spacer fluids, the spacer fluid may have increased compatibility with displaced or adjacent fluids.

The spacer fluids generally should have a density suitable for a particular application as desired by those of ordinary skill in the art, with the benefit of this disclosure. In some embodiments, the spacer fluids may have a density in the range of from about 4 pounds per gallon ("lb/gal") (480 kg/m$^3$) to about 24 lg/gal (2900 kg/m$^3$). In other embodiments, the spacer fluids may have a density in the range of about 4 lb/gal (480 kg/m$^3$) to about 17 lb/gal (2040 kg/m$^3$). In yet other embodiments, the spacer fluids may have a density in the range of about 8 lg/gal (960 kg/m$^3$) to about 13 lb/gal (1600 kg/m$^3$). Embodiments of the spacer fluids may be foamed or unfoamed or include other means to reduce their densities known in the art, such as lightweight additives. Those of ordinary skill in the art, with the benefit of this disclosure, will recognize the appropriate density for a particular application.

Suitable spacer fluids may be prepared in accordance with any suitable technique. Without limitation, the desired quantity of water may be introduced into a mixer (e.g., a cement blender) followed by the spacer dry blend. Additional liquid additives and/or dry additives, if any, may be added to the water as desired prior to, or after, combination with the dry blend. This mixture may be agitated for a sufficient period of time to form a pumpable slurry. By way of example, pumps may be used for delivery of this pumpable slurry into the wellbore. As will be appreciated, the spacer fluid and/or the spacer dry blend may be prepared at the well site or prepared offsite and then transported to the well site. If prepared offsite, the spacer dry blend and/or spacer fluid may be transported to the well site using any suitable mode of transportation, including, without limitation, a truck, railcar, barge, or the like. Alternatively, the spacer fluid and/or spacer dry blend may be formulated at the well site, for example, where the components of the spacer fluid and/or spacer dry blend may be delivered from a transport (e.g., a vehicle or pipeline) and then mixed prior to placement downhole. As will be appreciated by those of ordinary skill in the art, with the benefit of this disclosure, other suitable techniques for preparing the spacer fluids may be used in accordance with embodiments.

With limitation, the spacer fluid (as described herein) may be used for displacing a first fluid from a wellbore, the wellbore penetrating a subterranean formation. The method may further include introducing the spacer fluid into the wellbore to displace at least a portion of the first fluid from the wellbore. Without limitation, the spacer fluid may displace the first fluid from a wellbore annulus, such as the annulus between a pipe string and the subterranean formation or between the pipe string and a larger conduit. Non-limiting examples of the first fluid displaced by the spacer fluid may include a drilling fluid. By way of example, the spacer fluid may be used to displace the drilling fluid from the wellbore. In addition to displacement of the drilling fluid from the wellbore, the spacer fluid may also remove the drilling fluid from the walls of the wellbore and/or piper string. Additional steps in the method may include, without limitation, introducing a pipe string into the wellbore, introducing a cement composition into the wellbore with the spacer fluid separating the cement composition and the first fluid.

As described herein, the spacer fluid may prevent the cement composition from contacting the first fluid, such as a drilling fluid. The spacer fluid may also remove the drilling fluid, dehydrated/gelled drilling fluid, and/or filter cake solids from the wellbore in advance of the cement composition. Removal of these compositions from the wellbore may enhance bonding of the cement composition to surfaces in the wellbore.

The displaced drilling fluid may include, for example, any number of fluids, such as solid suspensions, mixtures, and emulsions. A non-limiting example of a suitable drilling fluid may include an oil-based drilling fluid. An example of a suitable oil-based drilling fluid includes an invert emulsion. Without limitation, the oil-based drilling fluid may include an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, dialkylcarbonates, hydrocarbons, and combinations thereof.

The cement composition introduced into the wellbore may include hydraulic cement and water. A variety of hydraulic cements may be utilized in accordance with the present embodiments, including, but not limited to, those including calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may include a Portland cement. In some embodiments, the Portland cements may include cements classified as Classes A, C, H, or G cements according to American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III.

Without limitation, methods of using the spacer fluids described herein in well cementing will now be described in more detail with reference to FIGS. 1-3. Any of the embodiments of a spacer fluid described herein may apply in the context of FIGS. 1-3. FIG. 1 illustrates an example system 100 that may be used for preparation and delivery of a spacer fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. As illustrated on FIG. 1, the system 100 may include a vessel 105 and a pump 110. The pump 110 may be positioned downstream of the vessel 105 and may be fluidly coupled to a tubular 115 that is in fluid communication with the wellbore 120. The tubular 115 may be configured to circulate or otherwise deliver the spacer fluid to the wellbore 120. The tubular 115 may be comprised, for example, of one or more different pipes that extend into the wellbore 120. The pump 110 may be, for example, one or more high pressure or low-pressure pumps, which may be depend on, without limitation, the viscosity and density of the spacer fluid. Without limitation, the pump 110 may draw the spacer fluid from the vessel 105, elevate the spacer fluid to an appropriate pressure, and then introduce the spacer fluid to the tubular 115 for delivery downhole. Without limitation, the vessel 105 and pump 110 may be disposed on one or more cement trucks, for example. While not illustrated, system 100 may further include a recirculating mixer, a batch mixer and/or a jet mixer, which may be used for example, in preparation and/or storage of the spacer fluid. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
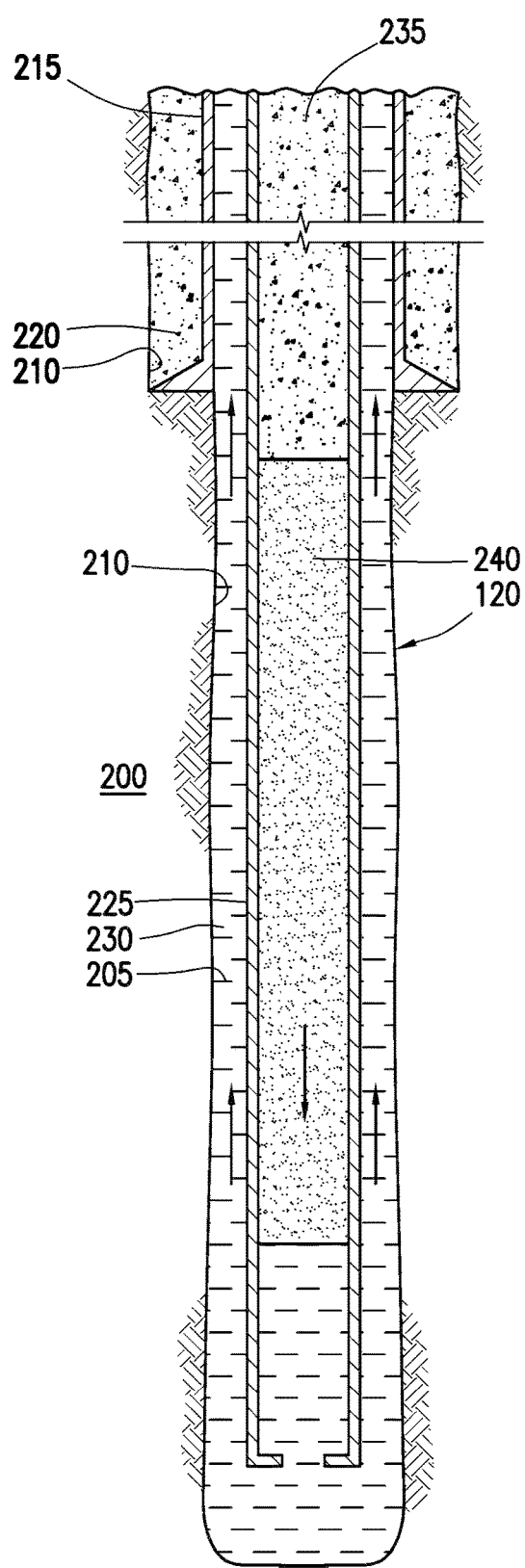
FIG. 2 is a schematic illustration of an example in which a spacer fluid is used between a cement composition and a drilling fluid.

FIG. 2 depicts one or more subterranean formations 200 penetrated by wellbore 120 with drilling fluid 205 disposed therein. The drilling fluid 205 may include the example drilling fluids disclosed herein as well as other suitable drilling fluids that will be readily apparent to those of ordinary skill in the art. While the wellbore 120 is shown extending generally vertically into the one or more subterranean formations 200, the principles described herein are also applicable to wellbores that extend at an angle through the one or more subterranean formations 200, such as horizontal and slanted wellbores. As illustrated, the wellbore 120 includes walls 210. Without limitation, a surface casing 215 may be cemented to the walls 210 of the wellbore 120 by cement sheath 220. Without limitation, one or more additional pipe strings (e.g., intermediate casing, production casing, liners, etc.), shown here as casing 225 may also be disposed in the wellbore 120. As illustrated, there is a wellbore annulus 230 formed between the casing 225 and the walls 210 of the wellbore 120 (and/or a larger conduit such as the surface casing 215). While not shown, one or more centralizers may be attached to the casing 225, for example, to centralize the casing 225 in the wellbore 120 prior to and during the cementing operation.

As illustrated, a cement composition 235 may be introduced into the wellbore 120. For example, the cement composition 235 may be pumped down the interior of the casing 225. A pump (e.g. pump 110 on FIG. 1) may be used for delivery of the cement composition 235 into the wellbore 120. It may be desired to circulate the cement composition 235 in the wellbore 120 until it is in the wellbore annulus 230. The cement composition 235 may include the example cement compositions disclosed herein as well as other suitable cement compositions that will be readily apparent to those of ordinary skill in the art. While not illustrated, other techniques may also be utilized for introduction of the cement composition 235. By way of example, reverse circulation techniques may be used that include introducing the cement composition 235 into the wellbore 120 by way of the wellbore annulus 230 instead of through the casing 225.

Without limitation, the spacer fluid 240 may be used to separate the drilling fluid 205 from the cement composition 235. The previous description with reference to FIG. 1 for preparation of a spacer fluid may be used for delivery of the spacer fluid 240 into the wellbore 120. Moreover, a pump (e.g., pump 110 on FIG. 1) may also be used for delivery of the spacer fluid 240 into the wellbore 120. The spacer fluid 240 may be used with the cement composition 235 for displacement of the drilling fluid 205 from the wellbore 120 as well as preparing the wellbore 120 for the cement composition 235. By way of example, the spacer fluid 240 may function, inter alia, to remove the drilling fluid 205, drilling fluid 205 that is dehydrated/gelled, and/or filter cake solids from the wellbore 120 in advance of the cement composition 235. While not shown, one or more plugs or other suitable devices may be used to physically separate the drilling fluid 205 from the spacer fluid 240 and/or the spacer fluid 240 from the cement composition 235.

Figure 3:
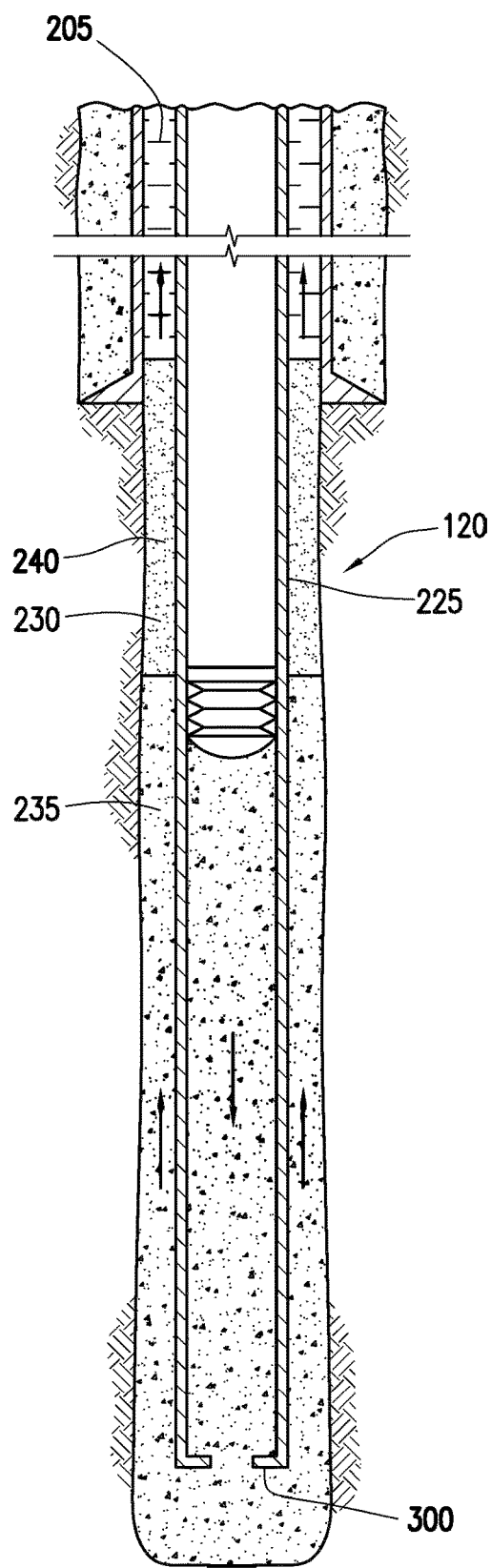
FIG. 3 is a schematic illustration of the embodiment of FIG. 2 showing displacement of the drilling fluid.

Referring now to FIG. 3, the drilling fluid 205 has been displaced from the wellbore annulus 230. As illustrated, the spacer fluid 240 and the cement composition 235 may be allowed to flow down the interior of the casing 225 through the bottom of the casing 225 (e.g., casing shoe 300) and up around the casing 225 into the wellbore annulus 230, thus displacing the drilling fluid 205. At least a portion of the displaced drilling fluid 205 may exit the wellbore annulus 230 via a flow line 125 and be deposited, for example, in one or more retention pits 130 (e.g., a mud pit), as shown in FIG. 1. Turning back to FIG. 3, the cement composition 235 may continue to be circulated until it has reached a desired location in the wellbore annulus 230. The spacer fluid 240 (or a portion thereof) and/or the cement composition 235 may be left in the wellbore annulus 230. As illustrated, the spacer fluid 240 may be disposed in the wellbore annulus 230 above or on top of the cement composition 235. The cement composition 235 may set in the wellbore annulus 230 to form an annular sheath of hardened, substantially impermeable material (i.e., a cement sheath) that may support and position the casing 225 in the wellbore 120.

Accordingly, this disclosure describes spacer fluids that include a spacer additive comprising a solid scouring material and a biopolymer gum while being essential free of clay. The systems and methods may further be characterized by one or more of the following statements:

Statement 1. An example method may include spacer fluid include water and a spacer additive. The spacer additive may include a solid scouring material and a biopolymer gum, wherein the solid scouring material includes crystalline silica in an amount of about 5 wt. % or less, and wherein the spacer fluid is essentially free of clay. The example method may further include and introducing the spacer fluid into a wellbore to displace at least a portion of a first fluid in the wellbore.

Statement 2. The method of statement 1, further including combining at least a spacer dry blend and water to form the spacer fluid, wherein the spacer dry blend includes the solid scouring material and the biopolymer.

Statement 3. The method of statement 1 or 2, wherein the solid scouring material has a specific gravity of less than 2.5, and wherein the spacer fluid is free of crystalline silica or includes crystalline silica in an amount of about 1 wt. % or less, not including any components having a specific gravity greater than 2.5.

Statement 4. The method of any preceding statement, wherein the solid scouring material has a Mohs hardness of about 6 or greater, wherein the solid scouring material has a roundness of about 0.6 or less, and wherein the solid scouring material has a sphericity of about 0.6 or less.

Statement 5. The method of any preceding statement, wherein the solid scouring material includes at least one material selected from the group consisting of pumice, perlite, other volcanic glasses, fumed silica, fly ash, and combinations thereof, and wherein the biopolymer gum includes at least one gum selected from the group consisting of xanthan gum, diutan gum, welan gum, scleroglucan gum, and combinations thereof.

Statement 6. The method of any preceding statement, wherein the solid scouring material includes pumice, and wherein the biopolymer gum includes diutan gum.

Statement 7. The method of any preceding statement, wherein a weight ratio of the biopolymer gum to the solid scouring material in the spacer additive is about 10:90 to about 1:99.

Statement 8. The method of any preceding statement, wherein a weight ratio of the biopolymer gum to the solid scouring material in the spacer additive is about 3:97 to about 2:98.

Statement 9. The method of any preceding statement, wherein the spacer fluid further includes a solid surfactant composite.

Statement 10. The method of statement 9, wherein the solid surfactant composite has a mean particle size of about 5 microns to about 1,500 microns, and wherein the solid surfactant composite includes a wetting surfactant on a solid carrier.

Statement 11. The method of any preceding statement, wherein the spacer fluid further includes at least one additive selected from the group consisting of a defoaming agent, a weighting agent, and combinations thereof.

Statement 12. The method of any preceding statement, wherein the first fluid includes an oil-based drilling fluid.

Statement 13. The method of any preceding statement, further including introducing a cement composition into the wellbore behind the spacer fluid.

Statement 14. Another example may include a method for displacing wellbore fluids. The method may include providing a spacer dry blend that includes a spacer additive, a solid surfactant composite, and a weighting agent having a specific gravity greater than 2.5, wherein the spacer additive includes pumice and diutan gum in a diutan gum to pumice weight ratio of about 2:98 to about 3:97, and wherein the solid surfactant composite includes a surfactant on a solid carrier. The method may include combining at least the spacer dry blend and water to form a spacer fluid, wherein the spacer fluid is essentially free of clay comprising montmorillonite clay, attapulgite clay, and sepiolite clay. The method may include introducing the spacer fluid into a wellbore to displace at least a portion of an oil-based drilling fluid in the wellbore.

Statement 15. The method of statement 14, further including introducing a cement composition into the wellbore behind the spacer fluid.

Statement 16. An example spacer fluid for use in displacing wellbore fluids may include water and a spacer additive. The spacer additive may include a solid scouring material and a biopolymer gum, wherein the solid scouring material includes crystalline silica in an amount of about 2.5 wt. % or less, and wherein the spacer fluid is essentially free of clay.

Statement 17. The spacer fluid of statement 16, wherein the solid scouring material has a specific gravity of less than 2.5, and wherein the spacer fluid is free of crystalline silica or includes crystalline silica in an amount of about 1 wt. % or less, not including any components having a specific gravity greater than 2.5.

Statement 18. The spacer fluid of statement 16 or 17, wherein the solid scouring material has a Mohs hardness of about 6 or greater, wherein the solid scouring material has a roundness of about 0.6 or less, and wherein the solid scouring material has a sphericity of about 0.6 or less.

Statement 19. The spacer fluid of any one of statements 16 to 18, wherein the solid scouring material includes pumice, and wherein the biopolymer gum includes diutan gum.

Statement 20. The spacer fluid of any one of statements 16 to 19, wherein the spacer fluid further includes a solid surfactant composite, wherein the solid surfactant composite includes a wetting surfactant on a solid carrier.

To facilitate a better understanding of the present disclosure, the following examples of certain aspects of some embodiments are given. In no way should the following examples be read to limit, or define, the scope of the disclosure. In the following examples, concentrations are given in weight percent of the overall composition.

Example 1

A sample spacer fluid (Spacer 1) was prepared and evaluated for fluid compatibility with a first oil-based mud (OBM1). Spacer 1 had a density of 10.5 lbm/gal (1260 kg/m$^3$) and composition provided in Table 1. Solid Surfactant Composite 1 included in Spacer 1 was a water-wetting surfactant (C6-C10 alcohol ethoxylate sulfate ammonium salt) disposed on an amorphous silica carrier. Solid Surfactant Composite 2 was an oil-wetting surfactant (ethoxylated nonylphenol blend) disposed on an amorphous silica carrier. OBM1 was a diesel-based invert emulsion drilling mud.

Spacer 1 was evaluated for fluid compatibility with OBM1 at 80° F. (27° C.) and 180° F. (82° C.). Spacer 1 and OBM1 were conditioned at the test temperature for 30 minutes prior to measurement. Ratios prescribed in API RP 10B2 (2013) were prepared, and rheological measurements were taken on Spacer 1, OBM1, and their mixtures using an OFITE 900 automated viscometer having an R1-B1-F1 configuration. Dial readings from the viscometer for the fluids are shown at rotational speeds in Tables 2 and 3. Rotational speeds of 60 rotations per minute (rpm) and 100 rpm are of key interest as they most closely approach shear rates commonly experienced during primary cementing. At 60 rpm and 100 rpm, none of the mixtures experienced adverse gelation or a dial reading greater than 10% of that of Spacer 1, indicating good fluid rheological compatibility for Spacer 1 and OBM1.

TABLE 1

Spacer 1 Composition

| Material | Mass, grams |
|---|---|
| Pumice | 111.36 |
| Diutan | 2.74 |
| Barite | 210.28 |
| Solid Surfactant Composite 1 | 6.85 |
| Solid Surfactant Composite 2 | 6.85 |
| Fresh Water | 668.47 |

TABLE 2

Rheological Compatibility of Spacer 1 and OBM1 at 80° F.

| Ratio of OBM1 to Spacer 1 | 300 rpm | 200 rpm | 100 rpm | 60 rpm | 30 rpm | 6 rpm | 3 rpm |
|---|---|---|---|---|---|---|---|
| 100:0 | 22 | 17 | 10 | 8 | 6 | 2.8 | 2.5 |
| 95:75 | 25 | 18 | 11 | 8 | 6 | 2.8 | 2.5 |
| 75:25 | 35 | 24 | 13 | 10 | 7 | 2.6 | 2.1 |
| 50:50 | 48 | 38 | 24 | 18 | 12 | 5.1 | 3.5 |
| 25:75 | 47 | 40 | 31 | 24 | 17 | 7.6 | 5.5 |
| 5:95 | 48 | 42 | 37 | 31 | 24 | 14.8 | 11.6 |
| 0:100 | 46 | 42 | 38 | 36 | 32 | 26.6 | 21.8 |

TABLE 3

Rheological compatibility of Spacer 1 and OBM1 at 180° F.

| Ratio of OBM1 to Spacer 1 | 300 rpm | 200 rpm | 100 rpm | 60 rpm | 30 rpm | 6 rpm | 3 rpm |
|---|---|---|---|---|---|---|---|
| 100:0 | 17 | 12 | 8 | 6 | 5 | 1.4 | 0.9 |
| 95:75 | 14 | 11 | 7 | 6 | 4 | 1.4 | 1.2 |
| 75:25 | 19 | 14 | 8 | 6 | 5 | 2.3 | 2.0 |
| 50:50 | 41 | 33 | 21 | 14 | 9 | 3.1 | 2.1 |
| 25:75 | 45 | 41 | 33 | 26 | 20 | 11.5 | 9.1 |
| 5:95 | 46 | 42 | 39 | 35 | 30 | 20.9 | 18.4 |
| 0:100 | 44 | 41 | 38 | 35 | 32 | 27.0 | 22.6 |

Example 2

A second sample spacer fluid (Spacer 2) was prepared and evaluated for fluid compatibility with a second oil-based mud (OBM2). Spacer 2 had a density of 11.5 lbm/gal (1380 kg/m$^3$) and composition provided in Table 4. Spacer 2 was evaluated for fluid compatibility at 80° F. (27° C.) and 180° F. (82° C.) with OBM2. OBM2 was a diesel-based invert emulsion drilling mud. Spacer 2 and OBM2 were conditioned at the test temperature for 30 minutes prior to measurement. Ratios prescribed in API RP 10B2 (2013) were prepared, and rheological measurements were taken on Spacer 2, OBM2, and their mixtures using an OFITE 900 automated viscometer having an R1-B1-F1 configuration. Dial readings from the viscometer for the fluids are shown at rotational speeds in Tables 5 and 6. Rotational speeds of 60 rpm and 100 rpm are of key interest as they most closely approach shear rates commonly experienced during primary cementing. At 60 rpm and 100 rpm none of the mixtures experienced adverse gelation or a dial reading greater than 10% of that of Spacer 2, indicating good fluid rheological compatibility for Spacer 2 and OBM2.

TABLE 4

Spacer 2 Composition

| Material | Mass, grams |
|---|---|
| Pumice | 69.35 |
| Diutan | 1.71 |
| Barite | 356.98 |
| Solid Surfactant Composite 1 | 6.85 |
| Solid Surfactant Composite 2 | 6.85 |
| Fresh Water | 660.68 |

TABLE 5

Rheological Compatibility of Spacer 2 and OBM2 at 80° F.

| Ratio of OBM2 to Spacer 2 | 300 rpm | 200 rpm | 100 rpm | 60 rpm | 30 rpm | 6 rpm | 3 rpm |
|---|---|---|---|---|---|---|---|
| 100:0 | 19 | 14 | 8 | 6 | 4 | 1.1 | 0.9 |
| 95:75 | 22 | 15 | 9 | 6 | 4 | 1.2 | 0.9 |
| 75:25 | 29 | 18 | 10 | 6 | 3 | 1.2 | 1.0 |
| 50:50 | 48 | 35 | 24 | 18 | 13 | 8.3 | 8.1 |
| 25:75 | 39 | 32 | 22 | 17 | 13 | 8.6 | 7.7 |
| 5:95 | 36 | 30 | 24 | 21 | 16 | 9.7 | 7.6 |
| 0:100 | 32 | 28 | 23 | 21 | 19 | 15.4 | 13.5 |

TABLE 6

Rheological Compatibility of Spacer 2 and OBM2 at 180° F.

| Ratio of OBM2 to Spacer 2 | 300 rpm | 200 rpm | 100 rpm | 60 rpm | 30 rpm | 6 rpm | 3 rpm |
|---|---|---|---|---|---|---|---|
| 100:0 | 12 | 9 | 6 | 3 | 2 | 1.0 | 0.9 |
| 95:75 | 13 | 9 | 5 | 5 | 2 | 0.6 | 0.5 |
| 75:25 | 25 | 12 | 6 | 4 | 2 | 0.5 | 0.4 |
| 50:50 | 47 | 38 | 22 | 15 | 11 | 8.6 | 8.4 |
| 25:75 | 33 | 30 | 25 | 20 | 15 | 11.2 | 10.5 |
| 5:95 | 28 | 26 | 22 | 20 | 16 | 10.7 | 9.4 |
| 0:100 | 28 | 26 | 22 | 21 | 20 | 16.7 | 15.5 |

Example 3

A third sample spacer fluid (Spacer 3) was prepared and evaluated for fluid compatibility with a third oil-based mud (OBM3). Spacer 3 had a density of 11.5 lbm/gal (1380 kg/m$^3$) and composition provided in Table 7. Spacer 3 was evaluated for fluid compatibility at 80° F. (27° C.) and 180° F. (82° C.) with OBM3. OBM3 was a distillate-based invert emulsion drilling mud. Spacer 3 and OBM3 were conditioned at the test temperature for 30 minutes prior to measurement. Ratios prescribed in API RP 10B2 (2013) were prepared, and rheological measurements were taken on Spacer 3, OBM3, and their mixtures using an OFITE 900 automated viscometer having an R1-B1-F1 configuration. Dial readings from the viscometer for the fluids are shown at rotational speeds in Tables 8 and 9. Rotational speeds of 60 rpm and 100 rpm are of key interest as they most closely approach shear rates commonly experienced during primary cementing. At 60 rpm and 100 rpm none of the mixtures experienced adverse gelation or a dial reading greater than 10% of that of Spacer 3, indicating good fluid rheological compatibility for Spacer 3 and OBM3.

TABLE 7

Spacer 3 Composition

| Material | Mass, grams |
| --- | --- |
| Pumice | 74.91 |
| Diutan | 1.84 |
| Barite | 353.19 |
| Solid Surfactant Composite 1 | 7.99 |
| Solid Surfactant Composite 2 | 7.99 |
| Fresh Water | 656.48 |

TABLE 8

Rheological Compatibility of Spacer 3 and OBM3 at 80° F.

| Ratio of OBM3 to Spacer 3 | 300 rpm | 200 rpm | 100 rpm | 60 rpm | 30 rpm | 6 rpm | 3 rpm |
| --- | --- | --- | --- | --- | --- | --- | --- |
| 100:0 | 12 | 9 | 5 | 4 | 4 | 1.4 | 1.2 |
| 95:75 | 12 | 8 | 5 | 3 | 2 | 0.7 | 0.6 |
| 75:25 | 14 | 10 | 7 | 5 | 3 | 0.6 | 0.4 |
| 50:50 | 32 | 24 | 15 | 10 | 6 | 3.2 | 3.0 |
| 25:75 | 34 | 29 | 22 | 18 | 12 | 5.3 | 4.1 |
| 5:95 | 38 | 32 | 26 | 22 | 18 | 10.8 | 9.6 |
| 0:100 | 35 | 31 | 26 | 23 | 21 | 16.9 | 14.9 |

TABLE 9

Rheological Compatibility of Spacer 3 and OBM3 at 180° F.

| Ratio of OBM to Spacer 3 | 300 rpm | 200 rpm | 100 rpm | 60 rpm | 30 rpm | 6 rpm | 3 rpm |
| --- | --- | --- | --- | --- | --- | --- | --- |
| 100:0 | 8 | 6 | 4 | 3 | 3 | 1.0 | 0.9 |
| 95:75 | 8 | 6 | 3 | 3 | 1 | 1.0 | 0.9 |
| 75:25 | 9 | 7 | 3 | 2 | 1 | 0.9 | 0.9 |
| 50:50 | 29 | 22 | 15 | 11 | 7 | 4.9 | 4.8 |
| 25:75 | 21 | 27 | 23 | 19 | 14 | 8.7 | 8.1 |
| 5:95 | 33 | 30 | 26 | 24 | 20 | 13.8 | 12.3 |
| 0:100 | 31 | 29 | 25 | 23 | 22 | 18.1 | 16.1 |

Example 4

A fourth sample spacer fluid (Spacer 4) was prepared and evaluated for fluid compatibility with a cement slurry (CMT) having composition provided in Table 11. Spacer 4 had a density of 11.5 lbm/gal (1380 kg/m$^3$) and composition provided in Table 10. Spacer 4 was evaluated for fluid compatibility at 80° F. (27° C.) and 180° F. (82° C.) with CMT. Spacer 4 and CMT were conditioned at the test temperature for 30 minutes prior to measurement. Ratios prescribed in API RP 10B2 (2013) were prepared, and rheological measurements were taken on Spacer 4, CMT, and their mixtures using an OFITE 900 automated viscometer having an R1-B1-F1 configuration. Dial readings from the viscometer for the fluids are shown at rotational speeds in Tables 12 and 13. Rotational speeds of 60 rpm and 100 rpm are of key interest as they most closely approach shear rates commonly experienced during primary cementing. At 60 rpm and 100 rpm none of the mixtures experienced adverse gelation or a dial reading greater than 10% of that of CMT, indicating good fluid rheological compatibility for Spacer 4 and CMT.

TABLE 10

Spacer 4 Composition

| Material | Mass, grams |
| --- | --- |
| Pumice | 74.91 |
| Diutan | 1.84 |
| Barite | 332.38 |
| Solid Surfactant Composite 1 | 7.99 |
| Solid Surfactant Composite 2 | 7.99 |
| Fresh Water | 677.29 |

TABLE 11

CMT Composition

| Material | Mass, grams |
| --- | --- |
| Type I/II Cement | 440.47 |
| Type F Fly Ash | 174.91 |
| Elastomer | 36.14 |
| Silica Fume | 21.61 |
| Fluid Loss Agent 1 | 3.07 |
| Expansion Aid | 24.62 |
| Fresh Water | 481.23 |

TABLE 12

Rheological Compatibility of Spacer 4 and CMT at 80° F.

| Ratio of CMT to Spacer 4 | 300 rpm | 200 rpm | 100 rpm | 60 rpm | 30 rpm | 6 rpm | 3 rpm |
| --- | --- | --- | --- | --- | --- | --- | --- |
| 100:0 | 138 | 105 | 66 | 48 | 31 | 11.5 | 8.3 |
| 95:75 | 146 | 110 | 71 | 51 | 34 | 13.2 | 9.7 |
| 75:25 | 120 | 94 | 63 | 47 | 34 | 15.7 | 10.8 |
| 50:50 | 81 | 66 | 49 | 40 | 31 | 20.7 | 17.6 |
| 25:75 | 54 | 45 | 36 | 32 | 27 | 21.3 | 19.4 |
| 5:95 | 40 | 34 | 28 | 26 | 23 | 19.0 | 16.4 |
| 0:100 | 35 | 30 | 25 | 23 | 20 | 17.5 | 15.6 |

TABLE 13

Rheological Compatibility of Spacer 4 and CMT at 180° F.

| Ratio of CMT to Spacer 4 | 300 rpm | 200 rpm | 100 rpm | 60 rpm | 30 rpm | 6 rpm | 3 rpm |
| --- | --- | --- | --- | --- | --- | --- | --- |
| 100:0 | 82 | 63 | 40 | 30 | 19 | 6.8 | 4.5 |
| 95:75 | 86 | 67 | 44 | 33 | 22 | 8.0 | 5.5 |
| 75:25 | 75 | 60 | 42 | 33 | 23 | 9.9 | 7.4 |
| 50:50 | 53 | 45 | 36 | 31 | 26 | 16.1 | 13.1 |
| 25:75 | 43 | 40 | 34 | 32 | 29 | 24.2 | 21.9 |
| 5:95 | 34 | 30 | 27 | 26 | 23 | 19.2 | 17.2 |
| 0:100 | 29 | 27 | 25 | 23 | 21 | 18.5 | 17.0 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for displacing wellbore fluids, comprising:
   providing a spacer additive comprising:
      a biopolymer comprising diutan gum; and
      a scouring material selected from the group consisting of pumice, perlite, fumed silica, and combinations thereof,
      wherein the spacer additive comprises a dry blend of the biopolymer and the scouring material,
      wherein the spacer dry blend has a diutan gum to scouring material weight ratio of about 2.4 to about 97.6, and
      wherein the spacer dry blend is essentially free of crystalline silica,
   preparing a spacer fluid comprising by combining water and the spacer additive, wherein the spacer fluid is essentially free of clay; and
   introducing the spacer fluid into a wellbore to displace at least a portion of a first fluid in the wellbore.

2. The method of claim 1, wherein the solid scouring material has a specific gravity of less than 2.5, and wherein the spacer fluid is free of crystalline silica or comprises crystalline silica in an amount of about 1 wt. % or less, not including any components having a specific gravity greater than 2.5.

3. The method of claim 1, wherein the solid scouring material has a Mohs hardness of about 6 or greater, wherein the solid scouring material has a roundness of about 0.6 or less, and wherein the solid scouring material has a sphericity of about 0.6 or less.

4. The method of claim 1, wherein the biopolymer gum further comprises at least one gum selected from the group consisting of xanthan gum, welan gum, scleroglucan gum, and combinations thereof.

5. The method of claim 1, wherein the solid scouring material comprises pumice, and wherein the biopolymer gum comprises diutan gum.

6. The method of claim 1, wherein the spacer fluid further comprises a solid surfactant composite.

7. The method of claim 6, wherein the solid surfactant composite has a mean particle size of about 5 microns to about 1,500 microns, and wherein the solid surfactant composite comprises a wetting surfactant on a solid carrier.

8. The method of claim 1, wherein the spacer fluid further comprises a defoaming agent.

9. The method of claim 1, wherein the first fluid comprises an oil-based drilling fluid.

10. The method of claim 1, further comprising introducing a cement composition into the wellbore behind the spacer fluid.

11. A method for displacing wellbore fluids, comprising:
   providing a spacer dry blend comprising a spacer additive, a solid surfactant composite, and a weighting agent having a specific gravity greater than 2.5, wherein the spacer additive comprises pumice and diutan gum in a diutan gum to pumice weight ratio of about 2.4 to about 97.6, and wherein the solid surfactant composite comprises a surfactant on a solid carrier;
   combining at least the spacer dry blend and water to form a spacer fluid, wherein the spacer fluid is essentially free of clay comprising montmorillonite clay, attapulgite clay, and sepiolite clay; and
   introducing the spacer fluid into a wellbore to displace at least a portion of an oil-based drilling fluid in the wellbore.

12. The method of claim 11, further comprising introducing a cement composition into the wellbore behind the spacer fluid.

13. The method of claim 11, wherein the solid surfactant composite has a mean particle size of about 5 microns to about 1,500 microns, and wherein the solid surfactant composite comprises a wetting surfactant on a solid carrier.

14. The method of claim 11, wherein the spacer additive has a specific gravity of less than 2.5, and wherein the spacer fluid is free of crystalline silica or comprises crystalline silica in an amount of about 1 wt. % or less, not including any components having a specific gravity greater than 2.5.

15. The method of claim 11, wherein the pumice has a Mohs hardness of about 6 or greater, wherein the pumice has a roundness of about 0.6 or less, and wherein the pumice has a sphericity of about 0.6 or less.

16. The method of claim 11, wherein the pumice has a mean particle size of about 1 micron to about 200 microns.

17. A method for displacing wellbore fluids, comprising:
   providing a spacer dry blend comprising:
      a biopolymer comprising diutan gum;
      a scouring agent comprising perlite;
      a solid surfactant composite; and a weighting agent comprising calcium carbonate, wherein the spacer dry blend has a scleroglucan gum to perlite weight ratio of about 2.4 to about 97.6; and combining at least the spacer dry blend and water to form a spacer fluid;

introducing the spacer fluid into a wellbore to displace at least a portion of an oil-based drilling fluid in the wellbore.

\* \* \* \* \*